Figure 4:
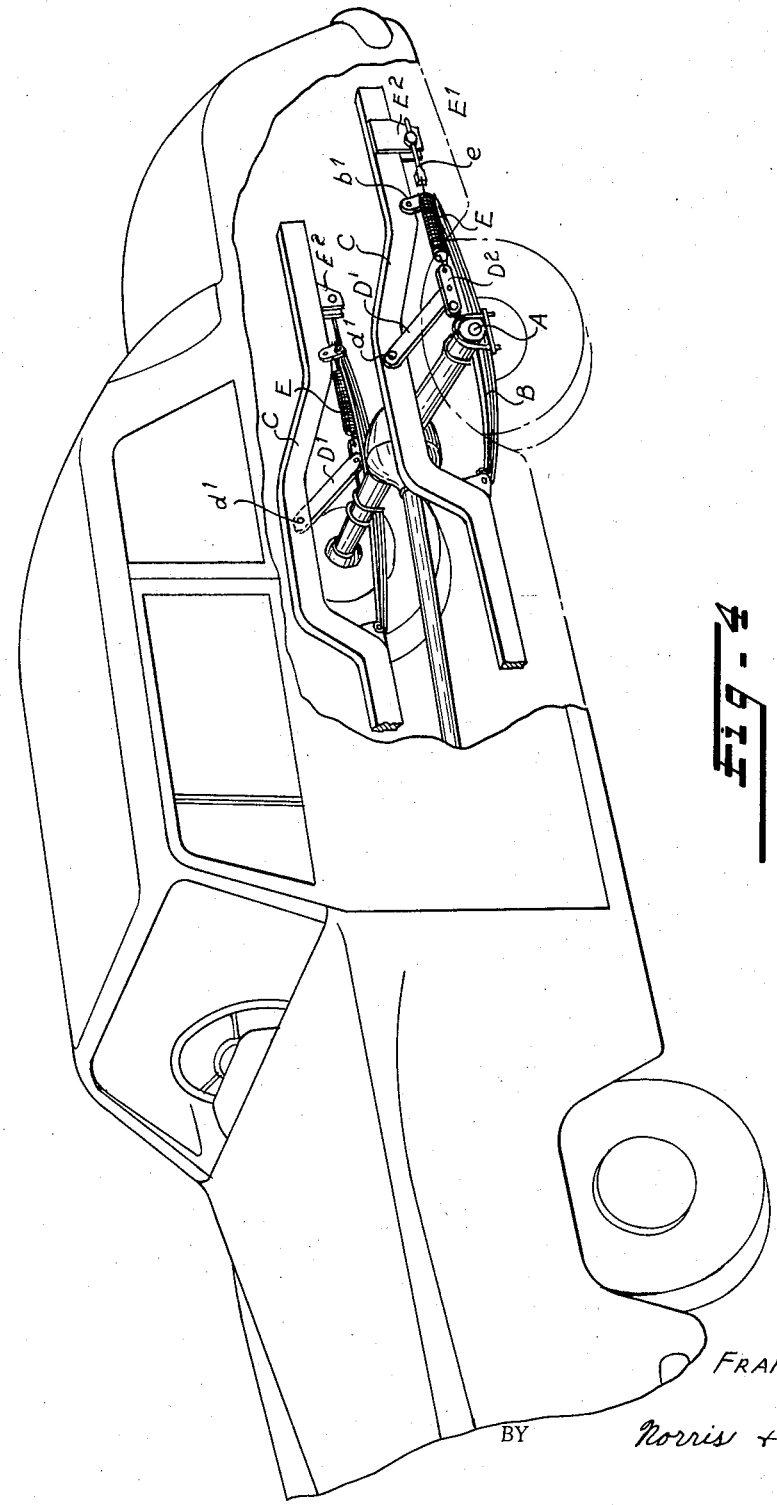

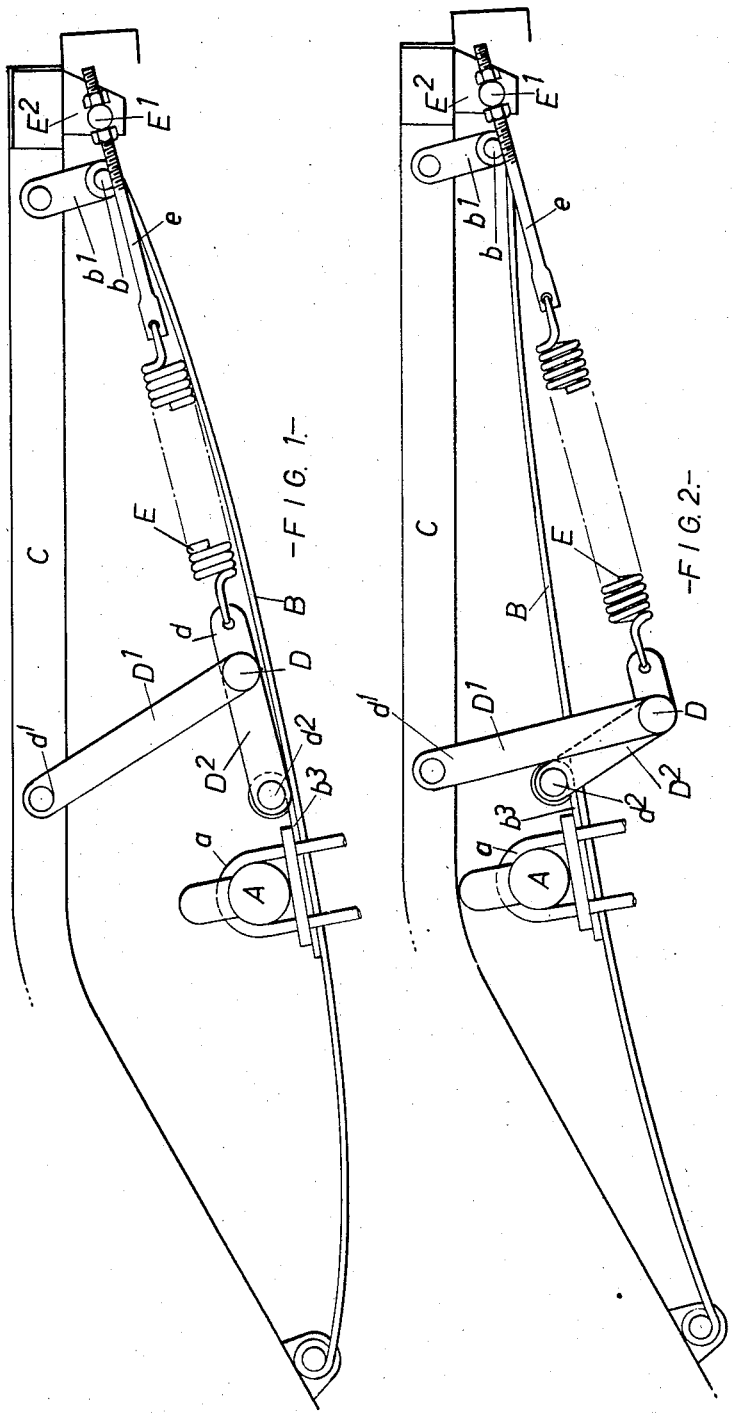

July 28, 1959  F. WOODHEAD  2,896,939
MEANS FOR CONTROLLING THE MAIN SPRINGS OF A VEHICLE SUSPENSION
Filed Dec. 10, 1956  3 Sheets-Sheet 2
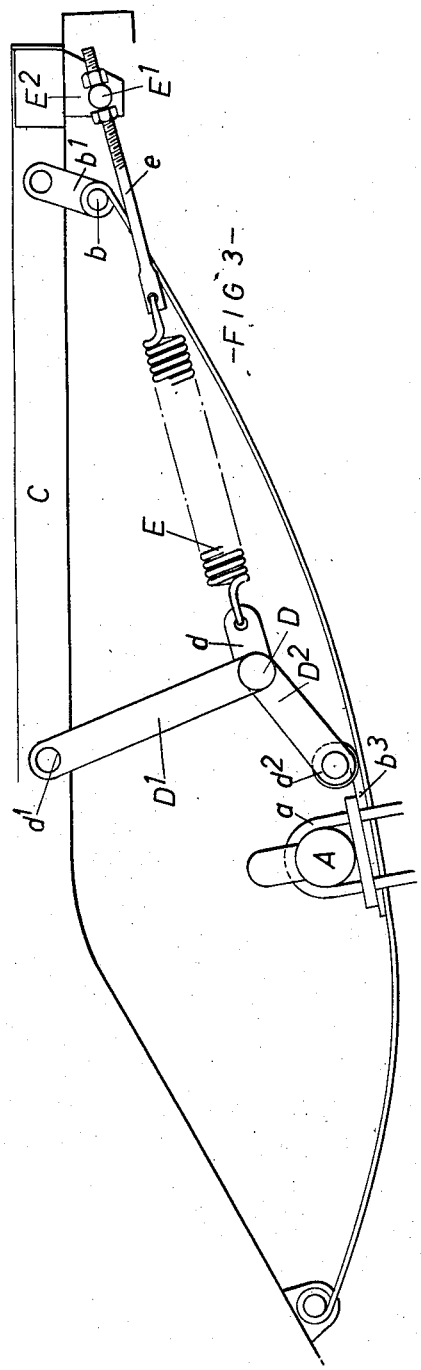
Inventor
Frank Woodhead
By
Attorneys July 28, 1959     F. WOODHEAD     2,896,939
MEANS FOR CONTROLLING THE MAIN SPRINGS OF A VEHICLE SUSPENSION
Filed Dec. 10, 1956     3 Sheets-Sheet 3

INVENTOR
FRANK WOODHEAD
BY Norris + Bateman
ATTORNEYS

United States Patent Office 2,896,939
Patented July 28, 1959

2,896,939

MEANS FOR CONTROLLING THE MAIN SPRINGS OF A VEHICLE SUSPENSION

Frank Woodhead, Far End, Yarm, England

Application December 10, 1956, Serial No. 627,385

Claims priority, application Great Britain January 5, 1956

6 Claims. (Cl. 267—16)

The object of this invention is the provision of means for controlling the main springs of a vehicle to provide desired condition of deflection, riding properties, and vehicle stability under different loads and road conditions. According to the present invention a toggle is introduced between the wheel axle or unsprung mass of the vehicle and the sprung body portion of the vehicle, the pivot point between the two arms of the toggle connected to controlling means which will tend to progressively control the position of the pivot to substantially maintain the relative positions of the wheel axle and the body constant with various loading conditions of the vehicle, and also to progressively resist rebound or swaying movement of the vehicle thereby providing a stabilising effect.

The invention is illustrated in and will be described with reference to the accompanying drawings. In these drawings:

Fig. 1 shows the preferred embodiment of the invention in which the toggle is controlled automatically by means of a tension spring, the relative positions of the main springs and the chassis being the positions under normal load, Fig. 2 is a similar view but showing the relative position of the main spring and the chassis under a severe bump, Fig. 3 is a view of the same arrangement showing the relative positions of the chassis and the main spring on the rebound of the former, and Fig. 4 is a generally perspective view of a vehicle broken away to show the suspension of the invention as employed at both ends of the axle.

In the embodiment of invention illustrated in the drawings the wheel axle A is secured to the main or leaf springs B, the ends of which are carried by shackle pins $b$ connected to the chassis C of the vehicle in the usual way.

A toggle consisting of the arms $D^1$, $D^2$ pivotally connected together by a pin D is interposed between the chassis C and the spring B, the upper end $d^1$ of the upper arm $D^1$ being pivotally mounted on the chassis C or on a bracket thereon and the end $d^2$ of the lower arm $D^2$ being pivotally mounted on a bracket $b^3$ carried by the axle housing $a$. The pivot pin D is connected either directly or through a short link $d$ to one end of a tension spring E, the other end of which is connected by a rod $e$ to a fixed pivot point $E^1$ mounted on a bracket $E^2$ secured to the chassis C or to any point on the sprung structure which is stationary relative to the chassis.

The rod $e$ may be screw threaded so that its operative length between the spring E and the pivot $E^1$ can be adjusted to vary the adjustment of the spring E for initial setting purposes. Alternatively, the spring E may be connected direct to the pivot point $E^1$ and the adjustment rod $e$ omitted.

The relative length of the two arms $D^1$, $D^2$ is preferably such that when the vehicle is normally loaded the arm $D^2$, the pivot pin D, the tension spring E and the rod $e$ will lie in a straight or substantially straight line.

In Figure 4 the foregoing suspension is shown as connected between the opposite side rails of chassis C and the opposite ends of axle A which here is the drive axle of the vehicle.

I claim:

1. In a vehicle having a chassis, transverse axle structure and a longitudinally extending main spring at each side of the vehicle supporting the chassis on said axle structure, means for controlling each main spring comprising a toggle having two arms of different lengths, an intermediate pivot connecting said arms and pivots connecting the arms at the remote ends of the toggle to the chassis and main spring respectively, and a tension spring connecting the intermediate pivot of the toggle to the chassis, the longer arm of the toggle being pivotally connected to the chassis and the shorter arm of the toggle being pivotally connected to the main spring, and the toggle arm being of such relative lengths and their pivots being so arranged that the longer toggle arm depends from the chassis in all operative positions of the main spring, and while the main spring is in its normally loaded position the shorter arm is substantially parallel to the main spring and the force applied to the intermediate pivot of the toggle by the tension spring increases progressively as the shorter arm of the toggle is moved upwardly or downwardly from said parallel position by deflection of the main spring under varying loads thereon.

2. In a vehicle having a chassis, transverse axle structure and a longitudinally extending main spring at each side of the vehicle supporting the chassis on said axle structure, means for controlling each main spring comprising a two armed toggle having an intermediate pivot connecting said arms and pivots connecting the arms at the remote ends of the toggle to the chassis and main spring respectively, and a controlling spring connecting the intermediate pivot of the toggle to the chassis, the toggle arm pivotally connected to the chassis being longer than the other toggle arm and depending from the chassis in all positions of the main spring and the other shorter toggle arm being pivotally connected to the main spring and being substantially in alignment with the controlling spring while the main spring is in its normally loaded position, the toggle arms being of such relative lengths and their pivots being so disposed that the shorter toggle arm is movable in one or the other direction from such alignment with the controlling spring by deflection of the main spring under varying loads thereon to thereby increase progressively the force applied by the controlling spring to the intermediate pivot of the toggle.

3. In a vehicle having a chassis, transverse axle structure and a longitudinally extending main spring at each side of the vehicle supporting the chassis on said axle structure, means for controlling each main spring comprising a two armed toggle having an intermediate pivot connecting its arms and pivots connecting the arms at the ends of the toggle to the chassis and main spring respectively, and a tension spring connecting the intermediate pivot of the toggle to the chassis, the toggle arm pivotally connected to the chassis being substantially longer than the other toggle arm, and the shorter toggle arm being of such length relatively to the length of the longer arm that it is substantially parallel to the main spring while the latter is in its normally loaded position but is movable upwardly or downwardly from such parallel position by deflection of the main spring under varying loads thereon to progressively increase the force applied by the tension spring to the intermediate pivot of the toggle.

4. In a vehicle having a chassis and transverse axle structure, a main leaf spring suspension at each side of the vehicle having its intermediate portion connected to the axle structure and its ends pivoted to the chassis, and a toggle mechanism for controlling each main spring action comprising two rigid arms of different length pivoted together at adjacent ends, means pivoting the other end of the longer arm on the chassis, means pivoting the other end of the shorter arm on the spring at said intermediate portion, and a toggle control spring extending longitudinally of said vehicle connected at one end to the pivotal connection between said arms and at its other end to the chassis, said shorter toggle arm being substantially aligned with said spring during normal load conditions.

5. In the vehicle defined in claim 4, said toggle control spring being connected to the chassis adjacent one pivoted end of the main spring.

6. In the vehicle defined in claim 4, said longer toggle arm depending from its pivot on the chassis in all operative positions of the main spring, and said shorter arm of the toggle being substantially aligned with said control spring during normal load condition of said main spring.

References Cited in the file of this patent

UNITED STATES PATENTS

| 2,264,070 | Davis | Nov. 25, 1941 |
| 2,661,204 | Gregoire | Dec. 1, 1953 |

FOREIGN PATENTS

| 251,581 | Great Britain | July 8, 1926 |